(12) United States Patent
Theising

(10) Patent No.: US 6,311,992 B1
(45) Date of Patent: Nov. 6, 2001

(54) LIFT DOLLY WITH PEDAL LATCH MECHANISM

(75) Inventor: John L. Theising, St. Peters, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/496,751

(22) Filed: Feb. 3, 2000

(51) Int. Cl.[7] .................................................. B60P 3/00
(52) U.S. Cl. ................................ 280/79.11; 280/43.13; 280/43.17; 414/458; 414/495
(58) Field of Search .................... 280/43.17, 79.11, 280/43.13; 414/444, 458, 476, 490, 495; 254/3 R, 3 C, 8 R, 8 C, 17, 120, 123; 292/218, 120, 128, 102

(56) References Cited

U.S. PATENT DOCUMENTS

| | | | |
|---|---|---|---|
| 2,937,850 | * 5/1960 | Winkler et al. | 254/8 |
| 3,845,933 | * 11/1974 | Heizer, Jr. | 254/8 R |
| 5,052,200 | * 10/1991 | Claar et al. | 70/123 |
| 5,308,094 | * 5/1994 | McWhorter et al. | 280/43.17 |
| 5,876,173 | * 3/1999 | English, Jr. | 414/458 |
| 5,957,649 | * 9/1999 | English, Jr. et al. | 414/458 |
| 6,079,931 | * 6/2000 | English, Jr. et al. | 414/458 |

* cited by examiner

Primary Examiner—J. J. Swann
Assistant Examiner—J. Allen Shriver
(74) Attorney, Agent, or Firm—Howrey Simon Arnold & White, LLP

(57) ABSTRACT

A lift dolly apparatus is described for use in lifting and transporting objects. A latching mechanism is described which securely latches the dolly in the lifted position and can be easily released by using a foot pedal.

26 Claims, 7 Drawing Sheets

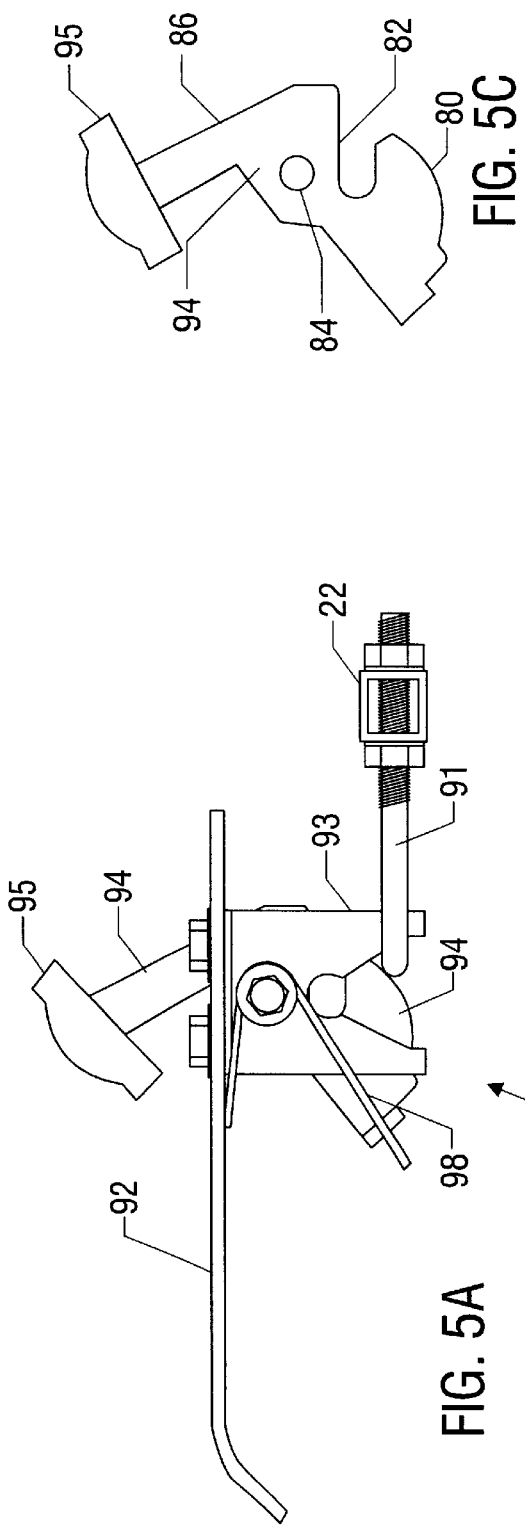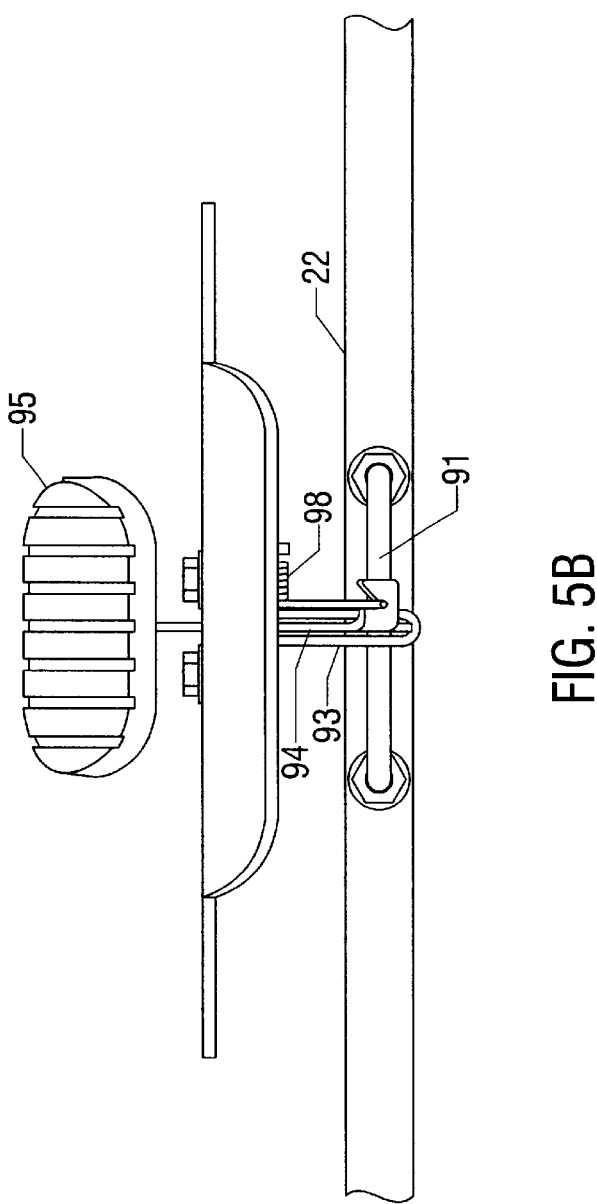

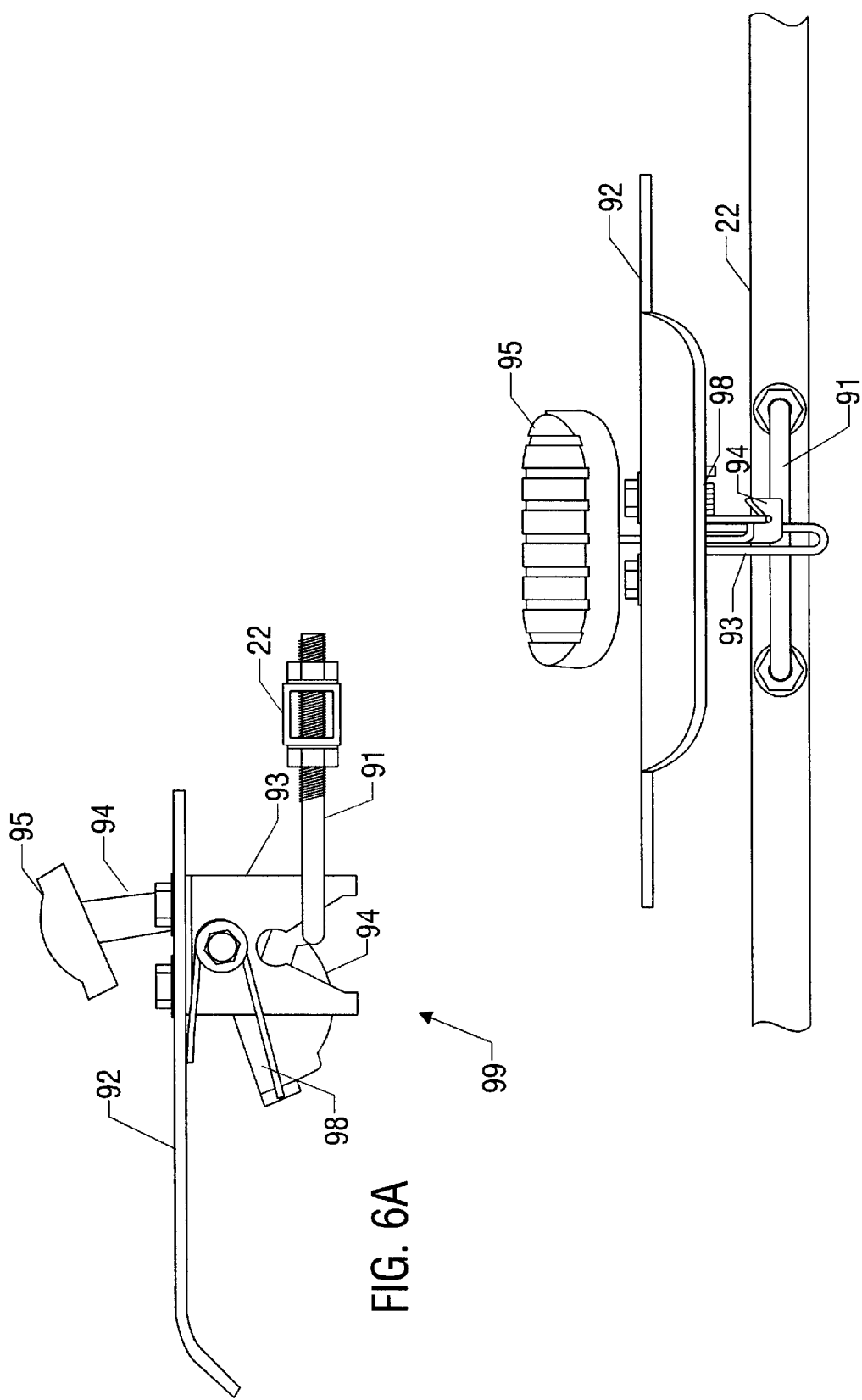

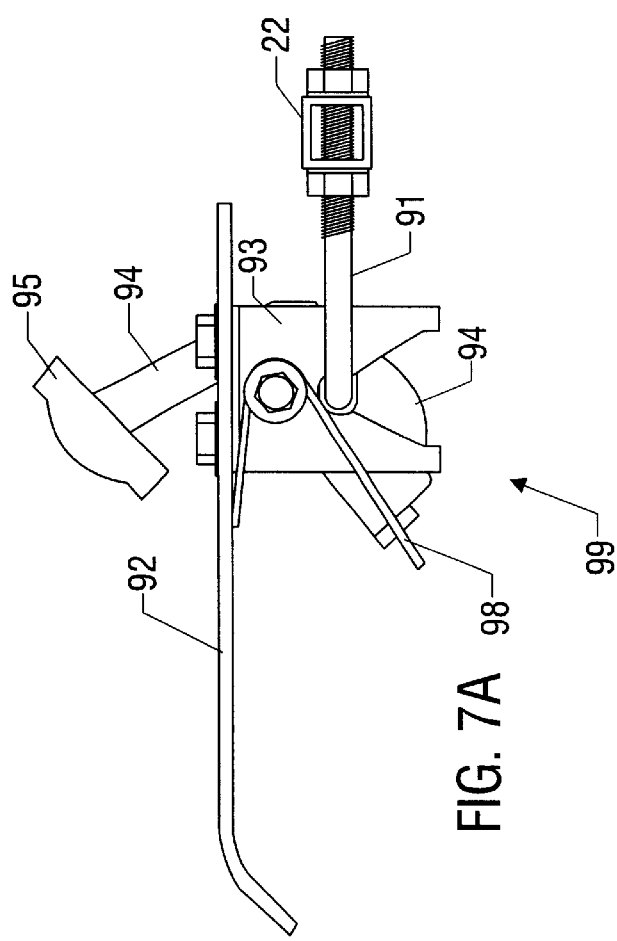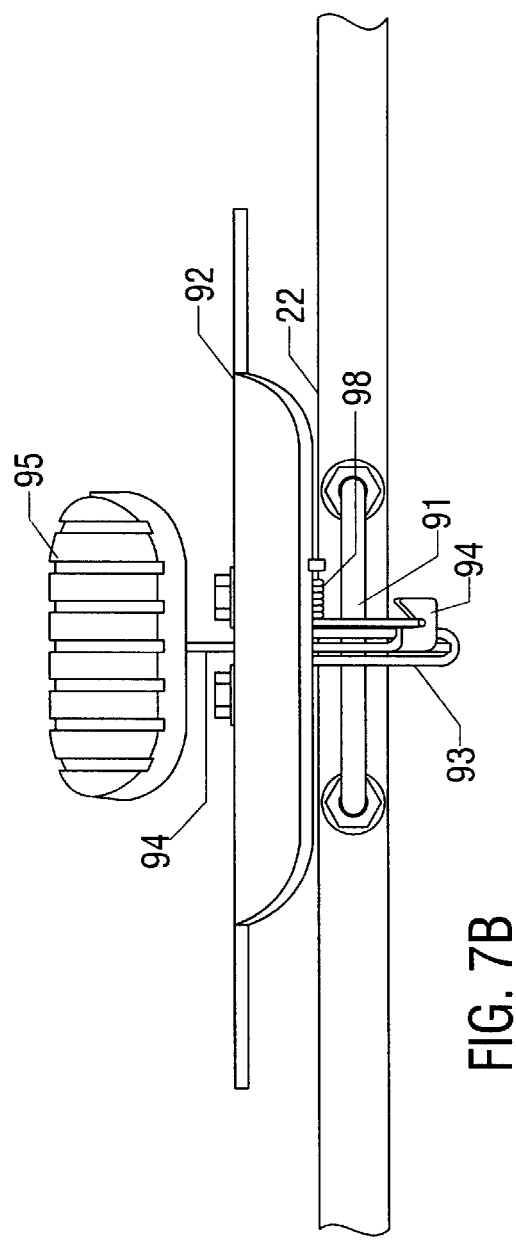

LIFT DOLLY WITH PEDAL LATCH MECHANISM

BACKGROUND OF THE INVENTION

1. Field of the Invention

The invention relates to a lifting device for moving heavy objects. More particularly, this invention relates to a lift dolly possessing a latch mechanism for securely locking the dolly in a lifted position.

2. Description of the Related Art

Often it is desirable to move heavy equipment in a timely fashion. Many devices are available for moving equipment on the factory floor or in a workshop. Some devices such as cranes are capable of transporting and lifting extremely heavy equipment. However, cranes are generally expensive and complex.

Alternatively, simple dollies that pivot about an axle are extremely portable and easy to use. However, these simple dollies are not capable of moving heavy equipment.

Therefore, it is desirable to provide a machine that is capable of lifting and moving heavy equipment in a simple method and timely fashion.

One attempt at providing such a lift dolly is disclosed in U.S. Pat. No. 5,876,173 to English, incorporated by reference in its entirety herein. While the invention described in U.S. Pat. No. 5,876,173 is capable of lifting and transporting machine tools, it has been discovered that the latching mechanism is difficult for a user to properly align, thus leading to an insecure lift.

Another attempt at providing such a lift dolly is disclosed in U.S. Pat. No. 5,957,649 to English, Stahl, and Hees, incorporated by reference in its entirety herein. While the invention described in U.S. Pat. No. 5,957,649 is also capable of lifting and transporting machine tools, it has also discovered that the toggle-type spring latching mechanism may prove to be unreliable to consistently latch and unlatch the dolly frames.

Therefore, it is also desirable to allow a user to align the latching mechanism in a robust, reliable manner. It is also desirable to provide a simple, robust, reliable latching mechanism which can be easily disengaged by a user to set the load down on the floor, without the use of power or hand tools.

For the foregoing reasons, there is a need for a lift dolly that is capable of lifting relatively heavy loads and transporting these loads in a secure fashion. The claimed invention is directed overcoming, or at least minimizing, disadvantages of the prior art.

SUMMARY OF THE INVENTION

The invention relates to an apparatus for lifting and transporting an object. In some embodiments, the lift dolly employs a pedal latch mechanism that attaches to a U-bolt to securely lock the lift dolly in the position of lifting a heavy object. Use of this pedal latch securely provides a secure attachment of the frames of the lift dolly, thus ensuring that the heavy object will not be dropped. Further, once the object has been moved to a desired new location, a user may depress the pedal on the latching mechanism to easily lower the object. Because the pedal latch may be disengaged by the user's foot pushing on the pedal, the user may easily and quickly disengage the lifting mechanism.

Further, because a bracket on the latch has a V-shape in some embodiments, problems associated with misalignment of the two frames is minimized. Also, to compensate for this possible misalignment, parts of the latching mechanism are adjustably attached to the frame.

In some aspects, a lift dolly for lifting and moving an object is described comprising a triangular first frame having a base and an apex, said base of the triangular first frame being connectable to the object, a first pair of castor stems, each castor stem having a castor thereon extending downwardly from the triangular first frame, a second frame having a first tube support, a second tube support, and a pivot end, said pivot end of the second frame being connectable to the object, a second pair of castor stems, each castor stem having a castor thereon extending downwardly from the second frame, and a latching mechanism for releasably securing the triangular first frame to the second frame, having a footplate attached to said first frame, a bracket mounted to the footplate, said bracket extending downwardly from said footplate, a cam latch rotatably mounted to said bracket, and a U-bolt attached to the second frame, said bracket having a notch facing downward for receiving said U-bolt, said cam latch releasably attachable to said U-bolt to secure the first frame to the second frame, said triangular first frame being connected to said second frame such that when a downward force is exerted on the apex of the triangular first frame, the triangular first frame pivots about the castors attached to the first pair of castor stems, thus moving the base of the triangular first frame in an upward direction, said downward force on the triangular first frame causing the triangular first frame to exert a downward force on the first tube support of the second frame, thus causing the second frame to pivot about the castors attached to the second pair of castor stems, thus moving the pivot end of the second frame in an upward direction, the upward movement of the base of the triangular first frame and of the pivot end thereby lever-lifting the object. In some embodiments, the latching mechanism has a torsion spring having a first end and a second end, said first end of said torsion spring functionally associated with said cam latch, said second end of said torsion spring attached to the footplate, said torsion spring locking said cam latch around said U-bolt to secure the first frame to the second frame.

In some embodiments, the notch in said bracket is V-shaped to facilitate the receiving of said U-bolt, and can be integrally formed with said footplate. In others, the U-bolt is adjustably attached to the second frame. Still in others, the lift dolly includes a cam latch, said foot pedal being functionally associated with said cam latch such that by depressing said foot pedal, said cam latch rotates to release said U-bolt thereby disconnecting the triangular first frame from the second frame. In some embodiments, the cam latch is integrally formed. In other aspects, a foot pedal is integrally connected to the cam latch.

Also described is a cam latch having a cam attachment means functionally associated with said bracket to rotatably attach the cam latch the V-shaped bracket, a cam engagement surface, for contacting said U-bolt thereby forcing said cam latch to rotate, a cam notch, for securing said U-bolt into position, a cam foot pedal support, said cam foot pedal support being connected to said foot pedal, said cam notch being located between said cam foot pedal support and said cam engagement surface.

In other aspects, a lift dolly for lifting and moving an object is described comprising a first frame having a base and a top, said base of the first frame being connectable to the object, a first pair of castor stems, each castor stem having a castor thereon extending downwardly from the first frame, a second frame having a first tube support, a second tube support, and a pivot end, said pivot end of second frame being connectable to the object, a second pair of castor stems, each castor stem having a castor thereon extending downwardly from the second frame, a latching mechanism for releasably securing the first frame to the second frame having a footplate attached to said first frame, a bracket mounted to the footplate, said bracket extending downwardly from said footplate, a cam latch rotatably mounted to said bracket, a torsion spring having a first end and a second end, said first end of said torsion spring functionally associated with said cam latch, said second end of said torsion spring attached to the footplate, and a U-bolt attached to the second frame, said bracket having a notch facing downward for receiving said U-bolt, said torsion spring locking said cam latch around said U-bolt to secure the first frame to the second frame, said first frame being connected to said second frame such that when a downward force is exerted on the top of the first frame, the first frame pivots about the castors attached to the first pair of castor stems, thus moving the base of the first frame in an upward direction, said downward force on the first frame causing the first frame to exert a downward force on the first tube support of the second frame, thus causing the second frame to pivot about the castors attached to the second pair of castor stems, thus moving the pivot end of the second frame in an upward direction, the upward movement of the base of the first frame and of the pivot end thereby lever-lifting the object.

In some aspects, the notch in said bracket is V-shaped to facilitate the receiving of said U-bolt. In others, the U-bolt is adjustably attached to the second frame.

The invention also relates to a latch mechanism for releasably securing a first frame of a lift dolly to a second frame of the lift dolly, to enable the lift dolly to be used to move an object, the latch mechanism comprising a footplate attached to said first frame, a bracket mounted to the footplate, said bracket extending downwardly from said footplate, a cam latch rotatably mounted to said bracket, and a U-bolt attached to the second frame, said bracket having a notch facing downward for receiving said U-bolt, said cam latch releasably attachable to said U-bolt to secure the first frame to the second frame. In some embodiments, the latch mechanism includes a torsion spring having a first end and a second end, said first end of said torsion spring functionally associated with said cam latch said second end of said torsion spring functionally associated with said footplate, said torsion spring locking said cam latch around said U-bolt to secure the first frame to the second frame.

In some embodiments the notch in said bracket is V-shaped to facilitate the receiving of said U-bolt, and in others, the U-bolt is adjustably attached to the second frame. Further, the latch mechanism may further comprise a foot pedal, said foot pedal being functionally associated with said cam latch such that by depressing said foot pedal, said cam latch rotates to release said U-bolt thereby disconnecting the triangular first frame from the second frame.

In other aspects, an improved lift dolly for lifting and moving an object is described of the type having a first frame with a pair of caster stems; a second frame having a pair of caster stems, each of the four caster stems extending downwardly; two pairs of attachment means for attaching the first and second frame to the object; a securement means for releasably securing the first frame and the second frame to one another, wherein the improvement comprises a latch mechanism for releasably securing a first frame of a lift dolly to a second frame of the lift dolly, latch mechanism comprising a footplate attached to said first frame, a bracket securely mounted to the footplate, said bracket extending downwardly from said footplate, a cam latch rotatably mounted to said bracket, a torsion spring having a first end and a second end, said first end of said torsion spring functionally associated with said cam latch, said second end of said torsion spring functionally associated with said footplate, and a U-bolt attached to the second frame, said bracket having a notch facing downward for receiving said U-bolt, said torsion spring locking said cam latch around said U-bolt to secure the first frame to the second frame.

Also described is a lift dolly for lifting and moving an object comprising a first means for lever-lifting, said first means for lever-lifting being connectable to the object, a first means for moving extending downwardly from the first means for lever-lifting, a second means for lever-lifting being connectable to the object, a second means for moving extending downwardly from the second means for lever-lifting, a latching mechanism for releasably securing the first means for lever-lifting to the second means for lever-lifting having a footplate attached to said first means for lever-lifting, a bracket mounted to the footplate, said bracket extending downwardly from said footplate, a cam latch rotatably mounted to said bracket, a torsion spring having a first end and a second end, said first end of said torsion spring functionally associated with said cam latch, said second end of said torsion spring attached to the footplate, and a U-bolt adjustably attached to the second means for lever-lifting, said bracketing having a notch facing downward for receiving said U-bolt, said first means for lever lifting being connected to said second means for lever-lifting such that when a downward force is exerted the first means for lever-lifting, the first means for lever-lifting pivots about first means for moving, said downward force on the first means for lever-lifting causing the first means for lever-lifting to exert a downward force on the second means for lever-lifting, thus causing the second means for lever-lifting to pivot about the second means for lever-lifting, the pivot of the first means for lever-lifting and the second means for lever-lifting thereby lifting the object.

Also described is a method of lifting and moving an object from a first location to a second location comprising, providing a lift dolly with a latch mechanism, said lift dolly having a triangular first frame having a base and an apex, said base of the triangular first frame being connectable to the object, a first pair of castor stems, each castor stem having a castor thereon extending downwardly from the triangular first frame, a second frame having a first tube support, a second tube support, and a pivot end, the pivot end of the second frame being connectable to the object, a second pair of castor stems, each castor stem having a castor thereon extending downwardly from the second frame, a second pair of attachment means for attaching the second frame to the object, a latching mechanism for releasably securing the triangular first frame to the second frame having a footplate attached to said first frame, a bracket mounted to the footplate, said bracket extending downwardly from said footplate, a cam latch rotatably mounted to said bracket, a torsion spring having a first end and a second end, said first end of said torsion spring functionally associated with said cam latch, said second end of said torsion spring attached to the footplate, and a U-bolt attached to the second frame, said bracket having a notch facing downward for receiving said U-bolt, said torsion spring locking said cam latch around said U-bolt to secure the first frame to the second frame, connecting base of the triangular first frame to the object connecting the pivot end of the second frame to the object, lever-lifting the object by exerting a downward force on said footplate and articulating the second frame by contacting said second tube support, until the cam latch is secured on the U-bolt of the second frame, moving the object to the second location by exerting a horizontal force on the object, and releasing the pedal latch mechanism by exerting a downward force on the foot pedal thereby lowering the object at the second location.

A method for lifting an object with a lift dolly is also described comprising providing a first frame having a footplate end and a rear support bar, said rear support bar being connectable to the object, providing a downward force on the footplate end of the first frame, rotating the first frame about a castor thereby moving the rear support bar in an upward direction, providing a second frame having a first tube support and a pivot end, said pivot end being connectable to the object, connecting said first frame to said second frame such that said downward force on the footplate end of the first frame concurrently provides a downward force on the second frame, and rotating the second frame about a castor, thus moving the pivot end in an upward direction, the upward direction of the pivot end and the rear support bar thereby lifting the object.

BRIEF DESCRIPTION OF THE DRAWINGS

FIGS. 5A and 5B show a latching mechanism of one embodiment of the present invention in an unlatched mode.

FIG. 5C shows a cam latch mechanism.

FIG. 6A and FIG. 6B show the pedal latching mechanism of that shown in FIG. 5, engaging a U-bolt.

FIG. 7A and FIG. 7B show the functioning of the pedal latching mechanism of one embodiment of the present invention in a latched mode.

Figure 1A:
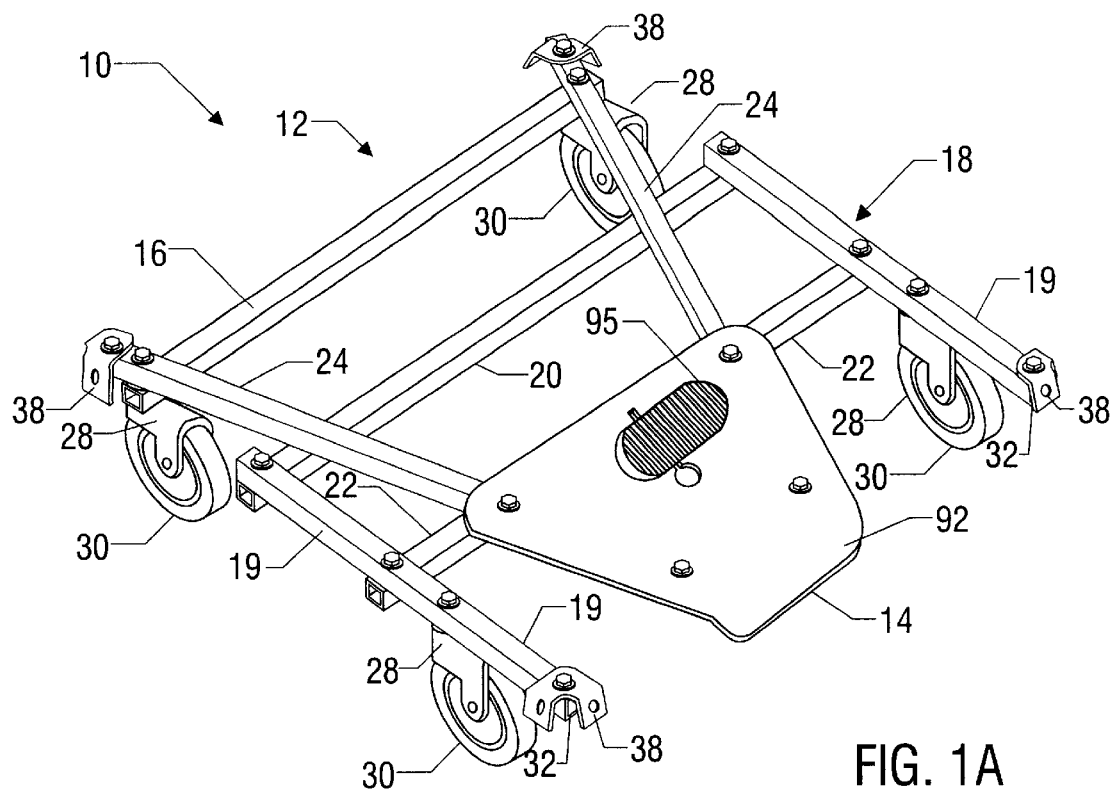
FIG. 1A is an isometric view of the lift dolly of one embodiment of the present invention with the latching mechanism latched.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

The invention relates to an apparatus for lifting and transporting an object. In some embodiments, the lift dolly employs a pedal latch mechanism that attaches to a U-bolt to securely lock the lift dolly in the position of lifting a heavy object. Use of this pedal latch provides a secure attachment of the frames of the lift dolly, thus ensuring that the heavy object will not be dropped. Further, once the object has been moved to a desired new location, a user may depress the pedal on the latching mechanism to easily lower the object. Because the pedal latch may be disengaged by the user's foot pushing on the pedal, the user may easily and quickly disengage the lifting mechanism.

In some embodiments of the invention, a bracket is included which helps to guide a locking member, or a U-bolt, into locking position. The bracket can be V-shaped, and could also be integrally formed in the footplate by lancing tabs directly into the footplate, for example. Further, the locking member or U-bolt may be adjustably attached to the lift dolly to allow of the latching mechanism to be utilized in a secure fashion in spite of manufacturing tolerance stack-up.

Illustrative embodiments of the invention are described below as they might be employed in the use lifting and transporting a machine tool. In the interest of clarity, not all features of an actual implementation are described in this specification. It will of course be appreciated that in the development of any such actual embodiment, numerous implementation-specific decisions must be made to achieve the developers' specific goals which will vary from one implementation to another. Moreover, it will be appreciated that such a development effort might be complex and time-consuming, but would nevertheless be a routine undertaking for those of ordinary skill in the art having the benefit of this disclosure.

Further aspects and advantages of the various embodiments of the invention will become apparent from consideration of the following description and drawings.

Embodiments of the invention will now be described with reference to the accompanying figures. Referring to FIG. 1A it can be seen that lift dolly 10 is generally comprised of a first frame 12 and a second frame 18. First frame 12 is triangular in shape and consists of base 16 and two frame sides 24 which form apex 14. Footplate 92 is attached to apex in 14 of first frame 12. Foot pedal 95 is attached to footplate 92 as described hereinafter.

Anchor plates 38 are attached to the ends of frame sides 24. Anchor plates 38 are used to attach lift dolly 10 to an object 100 to be lifted (not shown in this figure).

A first pair of castor stems 28 extends downwardly from first frame 12 near the base 16. Each castor stem 28 has a castor 30 attached to it.

Also shown in FIG. 1A is a second frame 18 which is comprised of a first tube support 20, a second tube support 22, and sides 19. At the pivot end 32 of sides 19 are anchor plates 38 for attaching an object to be moved 100 (not shown). A second pair of castor stems 28 extends downwardly from second frame 18 near second tube support 22. Each castor stem 28 has a castor 30. U-bolt 91 (not shown) is attached to second tube support 22 and can also be used to attached first frame 12 to second frame 18 via a latch mechanism hereinafter described.

Figure 1B:
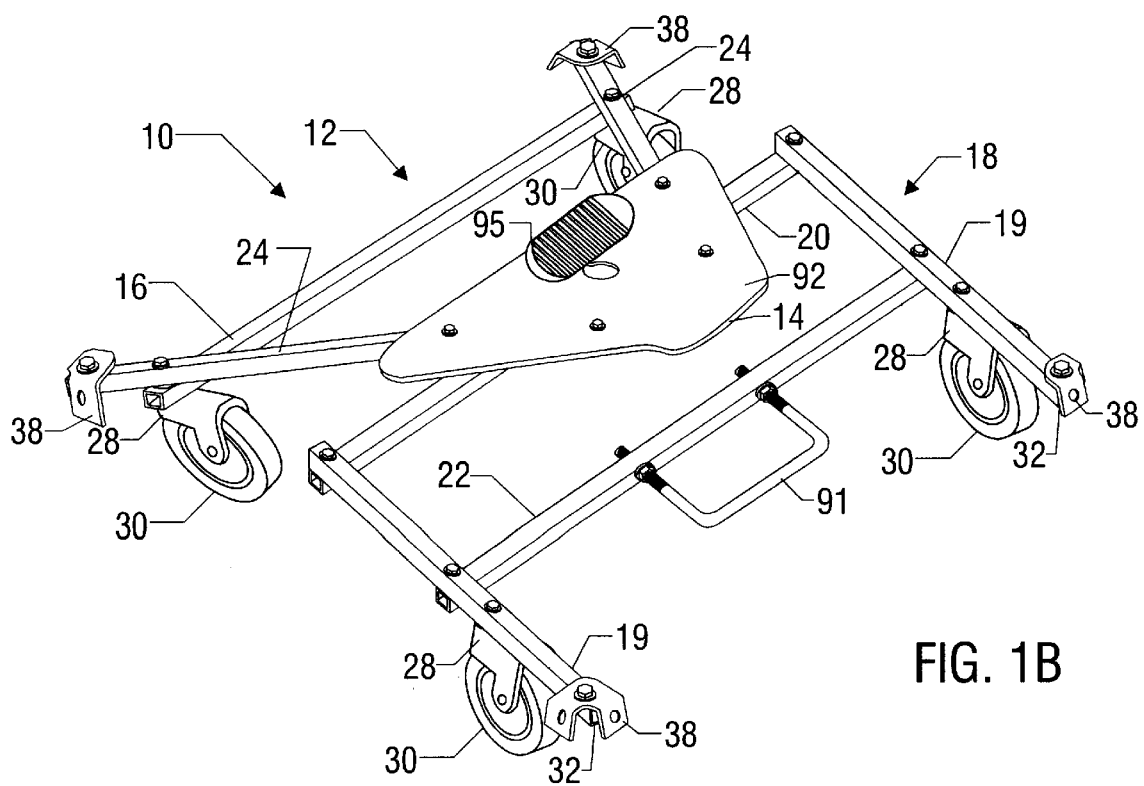
FIG. 1B is an isometric view of the lift dolly of one embodiment of the present invention with the latching mechanism unlatched.
Figure 2A:
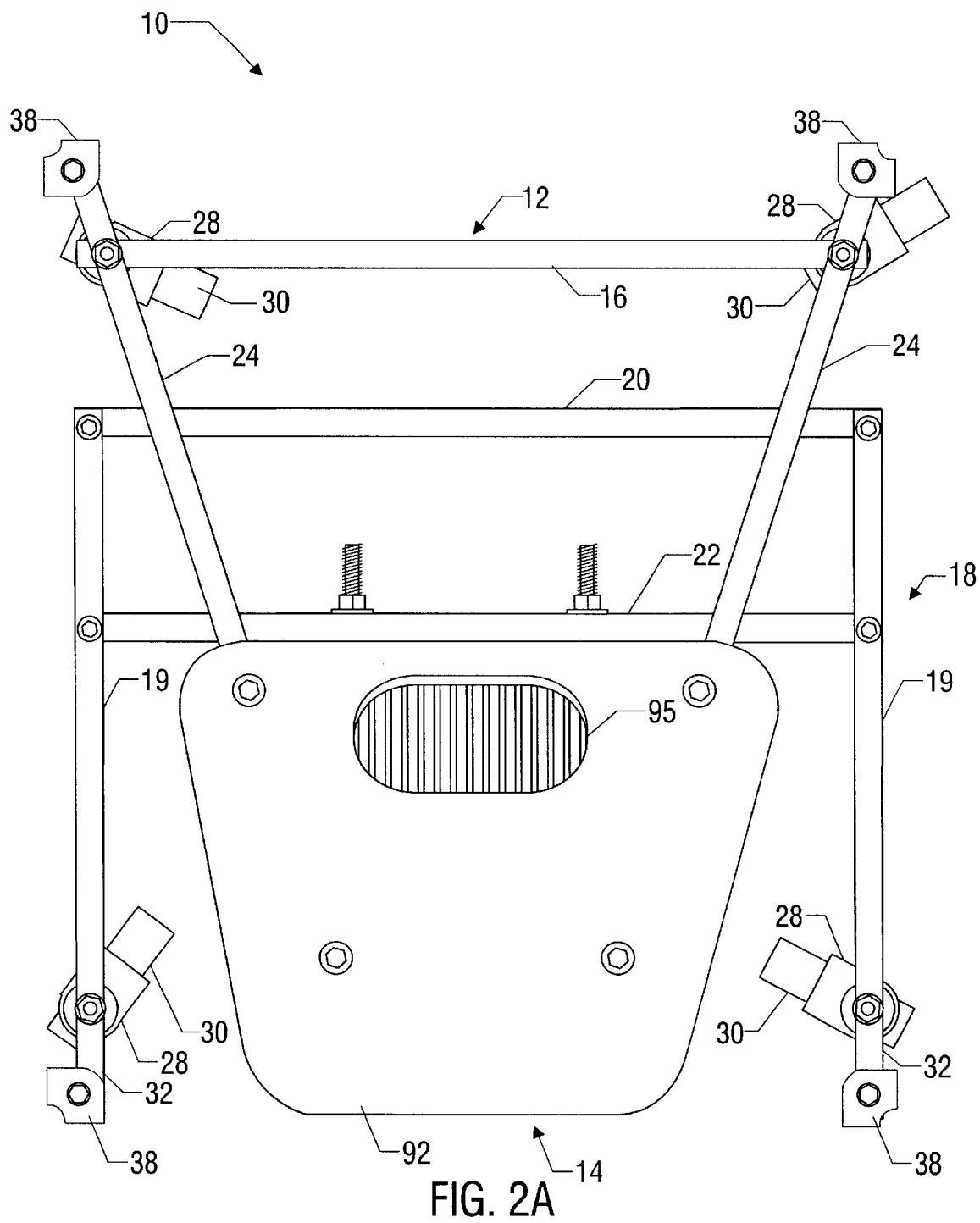
FIG. 2A shows a top view of the lift dolly of one embodiment of the present invention with a latching mechanism latched.
Figure 2B:
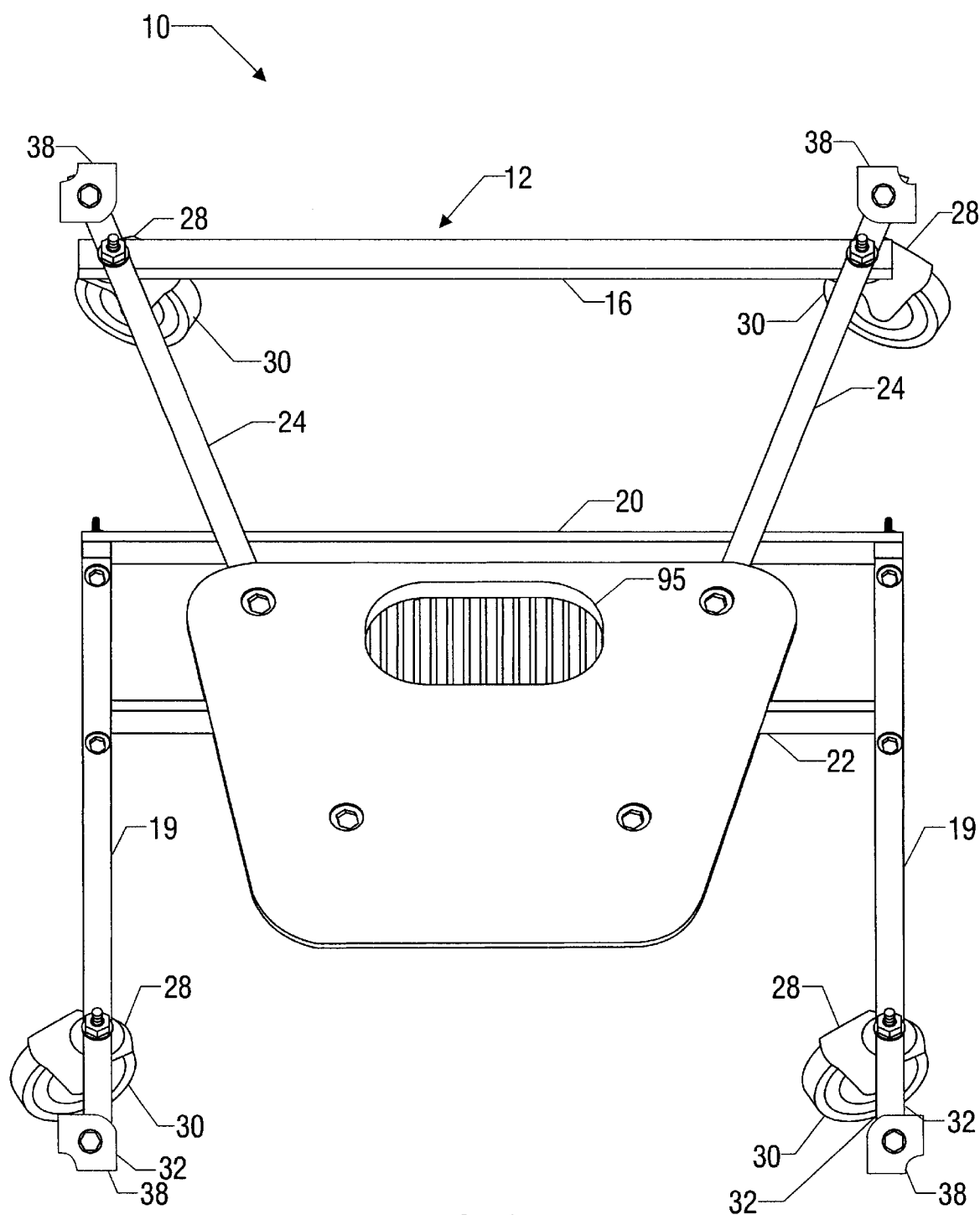
FIG. 2B shows a top view of the lift dolly of one embodiment of the present invention with a latching mechanism unlatched.

Referring to FIG. 1B, U-bolt 91 is shown. Lift dolly 10 is shown in FIG. 1B in its unlatched or open or non-lifting state. Lift dolly 10 in FIG. 1A is shown in its latched or closed or lifting state. FIG. 2A shows a top view of lift dolly 10 in its latched, closed, lifting state. FIG. 2B shows a top view of lift dolly 10 in its unlatched or open state.

Figure 3:
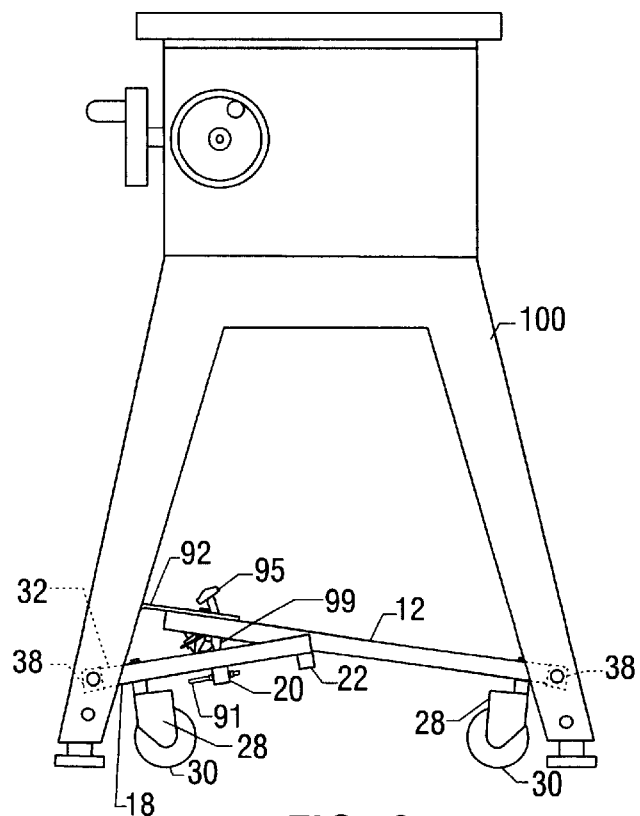
FIG. 3 shows the attachment of the lift dolly to an object to be lifted.

Referring to FIG. 3 lift dolly 10 is shown attached to object 100 to be lifted. Anchor plates 38 can be attached to object 100 via any suitable attaching methods such as a bolt and nut arrangement. In order to utilize the lift dolly 10 of the present invention, the first frame 12 is positioned near an object 100 to be lifted. Each anchor plate 38 is secured to the object 100. This securement can be accomplished in any appropriate fashion including bolting the frame to object 100.

Once anchor plates 38 are secured to object 100, second frame 18 is secured to the other end of the object 100 to be lifted. This securement is performed in a similar fashion to the securement of first frame 12 to object 100. After the second frame 18 is secured, the castors 30 rest on the floor.

Also shown in FIG. 3 is latch mechanism 99 to be described hereinafter. FIG. 3 shows the object 100 still sitting on the floor.

Figure 4:
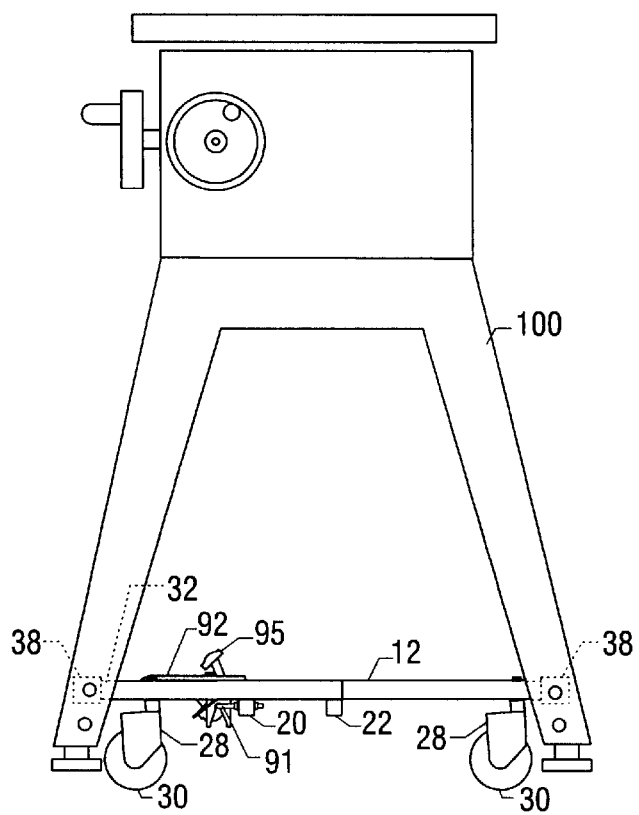
FIG. 4 shows the lift dolly lifting an object.

FIG. 4 shows object 100 lifted off the ground. To lift object 100, a downward pressure is exerted on footplate 92 of the first frame 12 causing the first frame 12 to rotate about anchor plate 38. This causes the castors 30 on first frame 12 to contact the ground. With continued downward pressure exerted on footplate 92, the first frame 12 rotates about castors 30 to lift base 16 of first frame 12, thus raising the first end of object 100. Exertion of downward pressure on footplate 92 also exerts pressure on second frame 18 via second tube support 22. This downward pressure exerted on the second tube support 22 causes second frame 18 to rotate about anchor plate 38. With a continued downward articulation of second tube support 22, the second plate forces castors 30 contact the ground. With continued downward pressure, the second frame pivots about castors 30 thereby moving the pivot end 32 of second frame 18 in an upward direction. Since pivot end 32 is attached to object 100 via anchor plate 38, the second end of object 100 is lifted off the ground.

When the first and second frames are generally horizontal, the object 100 is lifted off the ground and is ready for transport. During the lifting process the fulcrum of the lever system moves toward the center thereby increasing the mechanical advantage of the system.

When first frame 12 and second frame 18 are horizontal, the frames can be latched with a latching mechanism 99 in cooperation with U-bolt 91 (to be discussed hereinafter). This latch systems is described in FIGS. 5A–7B.

To lower the object 100 foot pedal 95 is depressed thereby releasing the previously secured first frame 12 from the second 18 frame thereby lowering object 100.

Referring to FIG. 5A, the latch mechanism previously described is shown. U-bolt 91 is attached to second tube support 22 of second frame 18. V-shaped bracket 93 is attached in this embodiment to the bottom of footplate 92 in any suitable manner such as with bolts. Although the bracket is shown as being V-shaped, any shape could be used. Further, this bracket, whether V-shaped or not, could be integrally formed in footplate 92 bracket.

Pivotally attached to said V-shaped bracket is cam latch 94. Cam latch 94 can contact U-bolt 91 on the bottom side of footplate 92 while also extending through footplate 92 to attach to foot pedal 95 as shown in FIG. 5A. Torsion spring 98 is attached to cam latch 94 as shown.

Cam latch 94 is shown alone in FIG. 5C. As can be seen, cam latch 94 is comprised of cam engagement surface 80, cam notch 82, cam attachment means 84, and cam foot pedal support 86. Cam foot pedal support 86 attached to foot pedal 95. In some embodiments, cam latch 94 is integral such that 100% of the force applied to foot pedal 95 is translated to cam latch engagement surface 80 thereby releasing the lift dolly from its lifted position. This integral composition of the cam latch 94's unique shape provides for a convenient method of unlocking the lift dolly in its lifted position.

FIG. 5A shows the latching mechanism with first frame 12 and second frame 18 in an unlatched or opened or non-lifting configuration. Cam latch 94 is rotatably secured to V-shape bracket 93 in this normal arrangement. Cam latch 94 rests against U-bolt 91. As second frame 18 engages cam latch 94, U-bolt 91 slides up cam 94 against the force of torsion spring 98. This forces cam latch 94 to rotate clockwise as seen in FIGS. 6A and 6B. Once the U-bolt 91 clears cam latch 94, torsion spring 98 causes cam latch 94 to return to its normal alignment with V-shaped bracket 93.

While torsion spring 98 is not required for the latching mechanism to function properly, the use of torsion spring 98 is advantageous because it provides a robust means to reliably rotate cam latch 94. Prior latching mechanisms have utilized regular springs in order to toggle a latch from an open to a closed position. It has been found that such a toggle mechanism is not reliable over time. Torsion spring 98, used in conjunction with V-shaped bracket 93 and cam latch 94, provides a secure, reliable method of securing the lift dolly in a raised position.

The V-shape of V-shaped bracket 93 is advantageous as it helps to guide the U-bolt 91 into the locking position. Therefore, should first frame 12 and second frame 18 be somewhat misaligned, the V-shape of V-shaped bracket 93 assists in assuring the secure connection between U-bolt 91 and V-shaped bracket 93. Again, the unique shape of cam latch 94, as shown in FIG. 5C, facilitates this locking procedure.

As shown in FIG. 7A, once first frame 12 and second frame 18 are horizontal, second frame 18 is secured to first frame 12 because U-bolt 91 is totally surrounded by cam latch 94 and V-shaped bracket latch 93.

Thus, this cam latch mechanism provides a secure method of interlocking first frame 12 and second frame 18 while heavy object 100 is moved. Once it is desired to place object 100 on the floor, foot pedal 95 may be depressed by applying a downward force on foot pedal 95. Cam latch 94 is again rotated clockwise against the force of torsion spring 98. This allows U-bolt 91 to be released from its secured attachment as shown in FIGS. 6A and 6B and finally in 5A and 5B.

In some embodiments, in order to provide the secure connection of the frames, and to ensure that U-bolt 91 is totally surrounded by cam latch 94 and V-shaped bracket 93, a simple but secure method of adjusting the position of U-bolt 91 relative to V-shaped bracket 93 is desirable. For example, as shown in FIG. 5A, U-bolt 91 is connected to second tube support via an adjustable means. As shown, the ends of U-bold 91 is treaded; second tube support 22 is provided with mating holes; and two nuts are used to secure U-bolt 91 to second tube support 22. This adjustable connection allows a user to ensure that U-bolt 91 is properly centered in the V of V-shaped bracket 93 thereby providing secure connection. This is advantageous to compensate for manufacturing tolerances and wear over time of the entire lift dolly mechanism. As would be appreciated by one of ordinary skill in the art, any type of adjustable connection that allows the U-bolt 91 to move could be used.

Although various embodiments have been shown and described, the invention is not so limited and will be understood to include all such modifications and variations as would be apparent to one skilled in the art.

The following table lists the description and the numbers as used herein and in the drawings attached hereto.

10 Lift Dolly
12 Triangular First Frame
14 Apex end

16 Rear Support Bar
18 Second frame
19 Sides
20 First tube support
22 Second tube support
24 Frame sides
28 Castor stems
30 Castor
32 Pivot End
38 Anchor plate
80 Cam Engagement Surface
82 Cam Notch
84 Cam Attachment Means
86 Cam Foot Pedal Support
91 U-Bolt
92 Footplate
93 V-shaped bracket
94 Cam latch
95 Foot pedal
98 Torsion spring
100 Object (to be lifted)

What is claimed is:

1. A lift dolly for lifting and moving an object comprising:
a triangular first frame having a base and an apex, said base of the triangular first frame being connectable to the object;
a first pair of castor stems, each castor stem having a castor thereon extending downwardly from the triangular first frame;
a second frame having a first tube support, a second tube support, and a pivot end, said pivot end of the second frame being connectable to the object;
a second pair of castor stems, each castor stem having a castor thereon extending downwardly from the second frame;
a latching mechanism for releasably securing the triangular first frame to the second frame, having
a footplate attached to said first frame;
a bracket mounted to the footplate, said bracket extending downwardly from said footplate;
a cam latch rotatably mounted to said bracket; and
a U-bolt attached to the second frame, said bracket having a notch facing downward for receiving said U-bolt, said cam latch releasably attachable to said U-bolt to secure the first frame to the second frame, said triangular first frame being connected to said second frame such that when a downward force is exerted on the apex of the triangular first frame, the triangular first frame pivots about the castors attached to the first pair of castor stems, thus moving the base of the triangular first frame in an upward direction,
said downward force on the triangular first frame causing the triangular first frame to exert a downward force on the first tube support of the second frame, thus causing the second frame to pivot about the castors attached to the second pair of castor stems, thus moving the pivot end of the second frame in an upward direction, the upward movement of the base of the triangular first frame and of the pivot end thereby lever-lifting the object; and
a foot pedal attached to said cam latch, said foot pedal being functionally associated with said cam latch such that by depressing said foot pedal, said cam latch rotates to release said U-bolt thereby disconnecting the triangular first frame from the second frame.

2. The lift dolly of claim 1 in which the latching mechanism further comprises:
a torsion spring having a first end and a second end,
said first end of said torsion spring functionally associated with said cam latch,
said second end of said torsion spring attached to the footplate,
said torsion spring locking said cam latch around said U-bolt to secure the first frame to the second frame.

3. The lift dolly of claim 1 wherein the notch in said bracket is V-shaped to facilitate the receiving of said U-bolt.

4. The lift dolly of claim 1 wherein the U-bolt is adjustably attached to the second frame.

5. The lift dolly of claim 1 wherein the bracket is integral with said footplate.

6. The lift dolly of claim 1 wherein the cam latch is integrally formed.

7. The lift dolly of claim 1 in which the cam latch further comprises a foot pedal integrally connected to the cam latch.

8. The lift dolly of claim 1 wherein the cam latch further comprises:
a cam attachment means functionally associated with said bracket to rotatably attach the cam latch the bracket;
a cam engagement surface, for contacting said U-bolt thereby forcing said cam latch to rotate;
a cam notch, for securing said U-bolt into position;
a cam foot pedal support, said cam foot pedal support being connected to said foot pedal;
said cam notch being located between said cam foot pedal support and said cam engagement surface.

9. A lift dolly for lifting and moving an object comprising:
a first frame having a base and a top, said base of the first frame being connectable to the object;
a first pair of castor stems, each castor stem having a castor thereon extending downwardly from the first frame;
a second frame having a first tube support, a second tube support, and a pivot end, said pivot end of second frame being connectable to the object;
a second pair of castor stems, each castor stem having a castor thereon extending downwardly from the second frame;
a latching mechanism for releasably securing the first frame to the second frame having
a footplate attached to said first frame;
a bracket mounted to the footplate, said bracket extending downwardly from said footplate;
a cam latch rotatably mounted to said bracket, a foot pedal being attached to the cam latch;
a torsion spring having a first end and a second end, said first end of said torsion spring functionally associated with said cam latch, said second end of said torsion spring attached to the footplate; and
a U-bolt attached to the second frame;
said bracket having a notch facing downward for receiving said U-bolt;
said torsion spring locking said cam latch around said U-bolt to secure the first frame to the second frame;
said first frame being connected to said second frame such that when a downward force is exerted on the top of the first frame, the first frame pivots about the castors attached to the first pair of castor stems, thus moving the base of the first frame in an upward direction;
said downward force on the first frame causing the first frame to exert a downward force on the first tube support of the second frame, thus causing the second frame to pivot about the castors attached to the second pair of castor stems, thus moving the pivot end of the second frame in an upward direction;

the upward movement of the base of the first frame and of the pivot end thereby lever-lifting the object;

said foot pedal being attached to the cam latch such that by depressing said foot pedal, said cam latch rotates to release said U-bolt thereby disconnecting the first frame from the second frame thus lowering the object.

10. The lift dolly of claim 9 wherein the notch in said bracket is V-shaped to facilitate the receiving of said U-bolt.

11. The lift dolly of claim 9 wherein the U-bolt is adjustably attached to the second frame.

12. The lift dolly of claim 9 wherein the bracket is integrally formed with the footplate.

13. A latch mechanism for use in combination with a lift dolly for releasably securing a first frame of the lift dolly to a second frame of the lift dolly, to enable the lift dolly to be used to move an object, the latch mechanism comprising:

a) a footplate, the footplate being attachable to said first frame;

b) a bracket mounted to the footplate, said bracket extending downwardly from said footplate;

c) a cam latch rotatably mounted to said bracket;

d) a U-bolt, the U-bolt being attachable to the second frame;

said bracket having a notch facing downward for receiving said U-bolt;

said cam latch releasably attachable to said U-bolt to secure the first frame to the second frame; and e) a foot pedal, said foot pedal being functionally associated with said cam latch such that by depressing said foot pedal, said cam latch rotates to release said U-bolt thereby disconnecting the triangular first frame from the second frame.

14. The latch mechanism of claim 13 further comprising:

a torsion spring having a first end and a second end;

said first end of said torsion spring functionally associated with said cam latch, said second end of said torsion spring functionally associated with said footplate, said torsion spring locking said cam latch around said U-bolt to secure the first frame to the second frame.

15. The latch mechanism of claim 13 wherein the notch in said bracket is V-shaped to facilitate the receiving of said U-bolt.

16. The latch mechanism of claim 13 wherein the bracket is integrally formed with the footplate.

17. The latch mechanism of claim 13 wherein the U-bolt is adjustably attached to the second frame.

18. An improved lift dolly for lifting and moving an object of the type having a first frame with a pair of caster stems; a second frame having a pair of caster stems, each of the four caster stems extending downwardly; two pairs of attachment means for attaching the first and second frame to the object; and a securement means for releasably securing the first frame and the second frame to one another, wherein the improvement comprises:

a) a footplate attachable to said first frame;

b) a bracket securely mounted to the footplate, said bracket extending downwardly from said footplate;

c) a cam latch rotatably mounted to said bracket;

d) a torsion spring having a first end and a second end, said first end of said torsion spring functionally associated with said cam latch, said second end of said torsion spring functionally associated with said footplate;

e) a U-bolt attachable to the second frame, said bracket having a notch facing downward for receiving said U-bolt, said torsion spring locking said cam latch around said U-bolt to secure the first frame to the second frame; and f) a foot pedal attached to said cam latch, said foot pedal being functionally associated with said cam latch such that by depressing said foot pedal, said cam latch rotates to release said U-bolt thereby disconnecting the triangular first frame from the second frame, the footplate, the foot pedal, the bracket, the cam latch, the torsion spring, and the U-bolt comprising a latch mechanism for releasably securing a first frame of a lift dolly to a second frame of the lift dolly.

19. The improvement of claim 18 wherein the notch in said bracket is V-shaped to facilitate the receiving of said U-bolt.

20. The improvement of claim 18 wherein the bracket is integral with the footplate.

21. The improvement of claim 18 wherein the U-bolt is adjustably attachable to the second frame.

22. A lift dolly for lifting and moving an object comprising:

a first means for lever-lifting, said first means for lever-lifting being connectable to the object;

a first means for moving extending downwardly from the first means for lever-lifting;

a second means for lever-lifting being connectable to the object;

a second means for moving extending downwardly from the second means for lever-lifting;

a latching mechanism for releasably securing the first means for lever-lifting to the second means for lever-lifting having a footplate attached to said first means for lever-lifting;

a bracket mounted to the footplate, said bracket extending downwardly from said footplate;

a cam latch rotatably mounted to said bracket, a foot pedal being attached to the cam latch;

an attachment means having a first end and a second end, said first end of said attachment means functionally associated with said cam latch, said second end of said attachment means attached to the footplate; and a U-bolt adjustably attached to the second means for lever-lifting;

said bracketing having a notch facing downward for receiving said U-bolt;

said first means for lever lifting being connected to said second means for lever-lifting such that when a downward force is exerted the first means for lever-lifting, the first means for lever-lifting pivots about first means for moving;

said downward force on the first means for lever-lifting causing the first means for lever-lifting to exert a downward force on the second means for lever-lifting, thus causing the second means for lever-lifting to pivot about the second means for lever-lifting, the pivot of the first means for lever-lifting and the second means for lever-lifting thereby lifting the object, the foot pedal being attached to the cam latch such that when a downward force is exerted on said foot pedal, said cam latch rotates to release said U-bolt to disconnect the first frame from the second frame thereby lowering the object.

23. A method of lifting and moving an object from a first location to a second location comprising:
   a) providing a lift dolly with a latch mechanism, said lift dolly having
      a triangular first frame having a base and an apex, said base of the triangular first frame being connectable to the object;
      a first pair of castor stems, each castor stem having a castor thereon extending downwardly from the triangular first frame;
      a second frame having a first tube support, a second tube support, and a pivot end, the pivot end of the second frame being connectable to the object;
      a second pair of castor stems, each castor stem having a castor thereon extending downwardly from the second frame;
      a second pair of attachment means for attaching the second frame to the object;
      a latching mechanism for releasably securing the triangular first frame to the second frame having:
      a footplate attached to said first frame;
         a bracket functionally associated with footplate, said bracket extending downwardly from said footplate;
         a cam latch rotatably mounted to said bracket, a foot pedal being attached to the cam latch;
         a torsion spring having a first end and a second end;
            said first end of said torsion spring functionally associated with said cam latch,
            said second end of said torsion spring attached to the footplate; and
         a U-bolt attached to the second frame;
            said bracket having a notch facing downward for receiving said U-bolt;
            said torsion spring locking said cam latch around said U-bolt to secure the first frame to the second frame;
   b) connecting the base of the triangular first frame to the object;
   c) connecting the pivot end of the second frame to the object;
   d) lever-lifting the object by exerting a downward force on said footplate and articulating the second frame by contacting said second tube support, until the cam latch is secured on the U-bolt of the second frame;
   e) moving the object to the second location by exerting a horizontal force on the object; and
   f) releasing the latching mechanism by exerting a downward force on the foot pedal to allow the cam latch to rotate to release the U-bolt to disconnect the first frame from the second frame thereby lowering the object at the second location.

24. A method of securely attaching and detaching a first frame of a lift dolly to a second frame of the lift dolly comprising:
   a) providing a footplate attached to said first frame;
   b) securely mounting a bracket to the footplate, said bracket extending downwardly from said footplate;
   c) rotatably mounting a cam latch to said bracket, a foot pedal being attached to said cam latch;
   d) providing a U-bolt attached to the second frame; said bracket having a notch facing downward for receiving said U-bolt; and
   e) exerting a downward pressure on the foot plate until the cam latch is secured around the U-boltthus raising the object; and
   f) exerting a downward force on the foot pedal until the U-bolt is released by the cam latch thus lowering the object.

25. The method of claim 24 further comprising:
   supplying a torsion spring having a first end and a second end;
      said first end of said torsion spring functionally associated with said cam latch,
      said second end of said torsion spring functionally associated with said footplate;
      said torsion spring locking said cam latch around said U-bolt to secure the first frame to the second frame.

26. A method for lifting and lowering an object with a lift dolly comprising:
   providing a first frame having a footplate end and a rear support bar,
      said rear support bar being connectable to the object,
      a cam latch having a foot pedal being rotatebly mounted to said footplate;
   providing a downward force on the footplate end of the first frame;
   rotating the first frame about a castor thereby moving the rear support bar in an upward direction;
   providing a second frame having a first tube support and a pivot end,
      said pivot end being connectable to the object,
      said second frame having a U-bolt;
   connecting said first frame to said second frame such that said downward force on the footplate end of the first frame concurrently provides a downward force on the second frame; and
   rotating the second frame about a castor, thus moving the pivot end in an upward direction and locking the cam latch around the U-bolt, the upward direction of the pivot end and the rear support bar thereby lifting the object and
   exerting a downward pressure on the foot pedal until the U-bolt is released from the cam latch thus lowering the object.

* * * * *